(12) United States Patent
Zhao et al.

(10) Patent No.: US 9,807,745 B2
(45) Date of Patent: Oct. 31, 2017

(54) RESOURCE ALLOCATION METHOD AND APPARATUS FOR RELAY NODE UNDER THE CONDITION OF CARRIER AGGREGATION

(71) Applicants: Yali Zhao, Beijing (CN); Wei Bao, Beijing (CN)

(72) Inventors: Yali Zhao, Beijing (CN); Wei Bao, Beijing (CN)

(73) Assignee: China Academy Of Telecommunications Technology, Beijing (CN)

(*) Notice: Subject to any disclaimer, the term of this patent is extended or adjusted under 35 U.S.C. 154(b) by 279 days.

(21) Appl. No.: 13/691,744

(22) Filed: Dec. 1, 2012

(65) Prior Publication Data
US 2013/0182635 A1    Jul. 18, 2013

Related U.S. Application Data

(63) Continuation of application No. PCT/CN2011/080772, filed on Oct. 14, 2011.

(30) Foreign Application Priority Data

Oct. 15, 2010  (CN) .......................... 2010 1 0515839

(51) Int. Cl.
*H04W 72/04* (2009.01)
*H04L 5/00* (2006.01)
(Continued)

(52) U.S. Cl.
CPC ...... *H04W 72/042* (2013.01); *H04B 7/15507* (2013.01); *H04L 5/001* (2013.01);
(Continued)

(58) Field of Classification Search
USPC ..................................... 370/252; 455/9, 423
See application file for complete search history.

(56) References Cited

U.S. PATENT DOCUMENTS

2006/0281404 A1* 12/2006 Lee ...................... H04B 7/2606
                                                 455/11.1
2007/0133500 A1*  6/2007 Rajkotia ................ H04B 7/022
                                                 370/348
(Continued)

FOREIGN PATENT DOCUMENTS

CN        101043640 A       9/2007
CN        101784075 A       7/2010
(Continued)

OTHER PUBLICATIONS

Office action dated Sep. 2, 2013 from corresponding CN Patent Application No. 201010515839.0 and its English translation.
(Continued)

*Primary Examiner* — Steven H Nguyen
(74) *Attorney, Agent, or Firm* — Ladas & Parry, LLP

(57) ABSTRACT

A resource allocation method and apparatus for a relay node under the condition of carrier aggregation are disclosed in the embodiments of the present invention. By applying the technical solution of the embodiments of the present invention, a relay node can determine information of cells, which are currently available for allocation, of a Un interface, and report the information to an eNB, so that the eNB can allocate corresponding Un interface resources for the relay node according to the information. Thus the eNB side can accurately obtain the information of the cell resources, which are available for allocation and currently correspond to the relay node, of the Un interface. Thus the problem is solved that the relay node cannot properly work under the condition of the carrier aggregation caused by the mismatch- (Continued)

ing between the Un interface resources directly allocated by the eNB and the relay node in the prior art.

17 Claims, 5 Drawing Sheets

(51) Int. Cl.
  *H04B 7/155* (2006.01)
  *H04W 24/00* (2009.01)
  *H04W 84/04* (2009.01)

(52) U.S. Cl.
  CPC .......... *H04L 5/0032* (2013.01); *H04L 5/0094* (2013.01); *H04W 72/04* (2013.01); *H04L 5/0044* (2013.01); *H04W 24/00* (2013.01); *H04W 84/047* (2013.01)

(56) References Cited

U.S. PATENT DOCUMENTS

| | | | |
|---|---|---|---|
| 2010/0130193 A1* | 5/2010 | Li | H04W 28/08 455/424 |
| 2010/0214972 A1* | 8/2010 | Che et al. | 370/315 |
| 2010/0238854 A1* | 9/2010 | Kazmi | H04B 7/155 370/315 |
| 2010/0238885 A1* | 9/2010 | Borran | H04B 17/0077 370/329 |
| 2010/0254301 A1* | 10/2010 | Blankenship | H04W 72/085 370/315 |
| 2010/0265873 A1* | 10/2010 | Yi | H04W 72/087 370/315 |
| 2010/0265874 A1* | 10/2010 | Palanki et al. | 370/315 |
| 2011/0222428 A1* | 9/2011 | Charbit et al. | 370/252 |
| 2011/0244851 A1* | 10/2011 | Gunnarsson et al. | 455/423 |
| 2011/0261747 A1* | 10/2011 | Wang et al. | 370/315 |
| 2011/0261749 A1* | 10/2011 | Youn et al. | 370/315 |
| 2011/0280127 A1* | 11/2011 | Raaf | H04L 45/125 370/230 |
| 2012/0071085 A1* | 3/2012 | Gunnarsson et al. | 455/7 |
| 2012/0087298 A1* | 4/2012 | Garavaglia | H04W 24/10 370/315 |
| 2012/0147810 A1* | 6/2012 | Wang et al. | 370/315 |
| 2012/0156984 A1* | 6/2012 | Gan | H04B 7/15542 455/7 |
| 2012/0182929 A1* | 7/2012 | Chen et al. | 370/315 |
| 2012/0201191 A1* | 8/2012 | Seo et al. | 370/315 |
| 2012/0236782 A1* | 9/2012 | Bucknell et al. | 370/315 |
| 2012/0243461 A1* | 9/2012 | Bucknell et al. | 370/315 |
| 2013/0039185 A1* | 2/2013 | Teyeb et al. | 370/235 |
| 2013/0040558 A1* | 2/2013 | Kazmi | 455/9 |
| 2013/0100877 A1* | 4/2013 | Naslund | H04B 7/155 370/315 |
| 2013/0182638 A1* | 7/2013 | Zhou | H04B 7/155 370/315 |
| 2013/0272190 A1* | 10/2013 | Du et al. | 370/315 |
| 2014/0187244 A1* | 7/2014 | Masini et al. | 455/436 |

FOREIGN PATENT DOCUMENTS

| | | |
|---|---|---|
| CN | 101860870 A | 10/2010 |
| KR | 100968037 B1 | 7/2010 |
| WO | WO 2011077066 A1 * | 6/2011 |

OTHER PUBLICATIONS

ISR/WO dated Jan. 19, 2012 from corresponding PCT/CN2011/080772 and its English translation.
EPO Communication dated Jan. 31, 2017 with Extended European Search Report dated Jan. 12, 2017 for European Patent Application No. 11832052.2.
PCT International Preliminary Report on Patentability Chapter I from PCT/CN2011/080772 dated Apr. 16, 2013 and its English translation from WIPO.
Mikio Iwamura: "'Relay Technology in LTE-Advanced'", NTT Docomo Technical Journal, vol. 12, No. 2, Sep. 1, 2010 (Sep. 1, 2010), pp. 29-36, XP055148979.
CATT: "Discussion on the combination of Relay and CA", 3GPP Draft; R2-101094, 3rd Generation Partnership Project (3GPP), Mobile Competence Centre; 650, Route Des Lucioles; F-06921 Sophia-Antipolis Cedex; France, vol. RAN WG2, no. San Francisco, USA; Feb. 22, 2010, Feb. 13, 2010 (Feb. 13, 2010), XP050421426.

* cited by examiner

RESOURCE ALLOCATION METHOD AND APPARATUS FOR RELAY NODE UNDER THE CONDITION OF CARRIER AGGREGATION

CROSS REFERENCE TO RELATED APPLICATIONS

This application is a continuation of PCT/CN2011/080772 filed on Oct. 14, 2011, which claims priority to Chinese Patent Application No. 201010515839.0 entitled "Resource Allocation Method and Apparatus for Relay Node Under the Condition of Carrier Aggregation" filed in the Patent Office of the People's Republic of China on Oct. 15, 2010, the disclosures of which are hereby incorporated by reference in their entireties.

TECHNICAL FIELD

The present invention relates to the field of communication technology, in particular to the resource allocation method and apparatus for relay node under the condition of carrier aggregation.

BACKGROUND

In a LTE (Long term Evolution) and previous wireless communication system, a cell only has a carrier (or a pair of carriers) generally, and a UE (User Equipment) can only receive and send data in a cell (on the carrier or carriers) at the same time.

FIG. 1 shows a schematic diagram of carrier bandwidth in a current LTE system. In the LTE system, the maximum bandwidth of a carrier is 20 MHz.

With the development of communication technology, an LTE-A (Long Term Evolution Advanced) system has great improvement on peak rate compared with an LTE system, and is required to reach 1 Gbps downlink and 500 Mbps uplink. Obviously, the transmission bandwidth of 20 MHz has been unable to meet such demand. Besides higher requirements on transmission rate, the LTE-A system needs better compatibility with the LTE system. In consideration of the improved peak rate, compatibility with the LTE system and full use of spectrum resource, a CA (Carrier Aggregation) technique is introduced in the LTE-A system, viz. the UE can aggregate a plurality of component carriers at the same time and transmit data on the carriers at the same time so as to improve data transmission rate.

To ensure that a UE of the LTE system can work under each aggregated carrier, each carrier is set to be no more than 20 MHz. Each component carrier in the LTE-A system is compatible with LTE Rel-8.

FIG. 2 shows a schematic diagram of the CA technique in a current LTE-A system.

In the LTE-A system shown in FIG. 2, the UE can aggregate 4 carriers. A Network side can transmit data with the UE on 4 carriers at the same time.

Furthermore, FIG. 3 shows a schematic diagram for a network structure of a current system including an RN (Relay Node); wherein, an eNB (evolved NodeB) is connected to a core network (CN) through a wire interface, the RN is connected to a DeNB (Donor eNB) through a wireless interface, an R-UE is connected to the RN through the wireless interface (Uu interface).

In prior art, the RN can be divided into the following types according to type of a relay data package:
L1 RN (Layer 1 Relay Node);
L2 RN (Layer 2 Relay Node);
L3 RN (Layer 3 Relay Node).
Wherein, the L3 RN can be divided into the following two kinds according to that whether it is necessary to divide carrier resource on time domain:
The RN requiring resource division;
The RN not requiring resource division;
It should be noted that the RN Type mentioned in follow-up description of embodiments of the present invention is the RN requiring or not requiring resource division.

The RN requiring resource division cannot receive and send at Uu interface and Un interface at the same time, otherwise self-interference will be caused. To avoid self-interference, a solution is to create 'gaps' in downlink access transmission time of an R-UE of the Uu interface. The gap can be used for a DL BH Link (Downlink Backhaul Link), viz. a downlink BH subframe. 'Gaps' configuration can be realized through a MBSFN (Multicast Broadcast Single Frequency Network) subframe.

FIG. 4 shows a schematic diagram for relay link downlink transmission at the Un interface by using the MBSFN subframe in the prior art. In these 'gaps', downlink transmission will be performed between the DeNB and the RN rather than between the RN and the R-UE.

Furthermore, RN starting process of the current network including RN is divided into the following two phase:
Phase I: the RN works as an UE access network. The specific process flow is as follows.

The RN is attached to a network in the same manner as an UE. The RN downloads initial configuration information from RN OAM, including a Donor Cell list allowable for connection, and then is attached.

Phase II: the RN works as an RN access network. The specific process flow is as follows.

First, the RN selects the Donor cell, the RN selects a Donor cell from the Donor cell list provided in Phase I.

Then a MME is selected for the RN: the RN informs the DeNB the identity of the RN through a RRC signaling during attachment. The DeNB selects a MME supporting the RN for the RN based on the information;

A GW is selected for the RN: the MME selects the DeNB as a P/S-GW of the RN after a CN informs the MME that the access node is the RN;

Corresponding S1 and X2 interfaces are recommended between the RN and the DeNB: the RN launches the process of establishing S1 and X2 on a bear built by the DeNB.

In the prior technical solution, L3 RN type is determined with the methods as below: If the application of CA for the Un interface is not taken into account in R10 edition of 3GPP LTE-A specification, RN type is determined by RN realization in a possible manner as below:

The RN acquires the cell supported by a RN Uu interface from a RN OAM;

The RN determines the cell used by the Un interface according to the donor cell accessed;

The RN determines the RN type according to the cell supported by the Uu and Un interface and software and hardware capacity of the RN (whether resource division is required);

The RN indicates type of the RN to the DeNB through a 1 bit indication.

In the prior technical solution, RN type can be indicated in two manners as below. The specific manner has not been decided.

Alt1: RAN type is carried in a RRC connection complete message;

Alt2: independent RN type indication message is defined;

During implementation of the embodiments of the present invention, the applicant finds that the following problems at least exist in the prior art:

If the CA is not taken into account and both Uu interface and Un interface only support a cell, CC/cell allocation of Un and Uu interfaces will not exist. The DeNB can work normally after determining whether it is necessary to configure the BH subframe according to the RN type after acquiring the RN type.

If the CA is taken into considered, the problem will be complicated. The cell that can be accessed to some RNs in Un interface may be not accessed owing to limit of the RN type. For example:

The RN accesses a DeNB1 for a RACH on cell a in Phase II for starting the RN. According to the cell list downloaded from the RN OAM in Phase I, the cells that can be used by the RN under the DeNB1 is cell a and cell b; meanwhile, the cell list of the Uu interface downloaded by the RN from the RN OAM comprises cell a, cell b and cell c. Thus, if the RN type reported by the RN to the DeNB is "Not requiring resource division", the DeNB cannot work normally. The main reasons are as follows:

(1) The DeNB does not know whether the RN supports other cells besides cell a, so the DeNB cannot realize CA operation for the RN;

(2) The DeNB does not know which cells may be used by the RN Uu interface and whether resource division is required when these cells are combined with the cell of the Un interface;

In conclusion, in order to ensure that the system combining the CA and the RN can work normally, it is necessary to solve the above problems; however, such technical solution has not been provided in prior art.

SUMMARY

The embodiments of the present invention provide a resource allocation method and apparatus for relay node under the condition of carrier aggregation. Resource of configurable cell of the Un interface is reported to an eNB through a RRC signaling, which solves the problem that a system combining a CA and an RN cannot work normally according to the prior mechanism.

To achieve the purpose, on one hand, the embodiments of the present invention provide a resource allocation method for a relay node under the condition of carrier aggregation, including:

acquiring, by the relay node, information of an available cell of a Un interface;

determining, by the relay node, its relay node type according to the information of the available cell of the Un interface;

determining, by the relay node, information of a current cell available for allocation of the Un interface according to the information of the available cell of the Un interface and the relay node type;

sending, by the relay node, the determined information of the current cell available for allocation of the Un interface to an eNB that the relay node is affiliated to, in order to make the eNB allocate Un interface resource for the relay node according to the information of the current cell available for allocation of the Un interface.

On the other hand, the embodiments of the present invention provide a relay node, including:

an acquisition module, for acquiring information of an available cell of a Un interface;

a type determination module for determining a relay node type according to the information of the available cell of the Un interface acquired by the acquisition module;

an information determination module for determining information of a current cell available for allocation of the Un interface of the relay node according to the information of the available cell of the Un interface acquired by the acquisition module and the relay node type determined by the type determination module;

a sending module for sending the information of the current cell available for allocation of the Un interface determined by the information determination module to the eNB that the relay node is affiliated to in order to make the eNB allocate Un interface resource for the relay node according to the information of the current cell available for allocation of the Un interface.

On the other hand, the embodiments of the present invention provide a resource allocation method for a relay node under the condition of carrier aggregation, including:

receiving, by an eNB, information of a current cell available for allocation of a Un interface sent by the relay node;

allocating, by the eNB, resource of the Un interface for the relay node according to the information of the current cell available for allocation of the Un interface.

Besides, the embodiments of the present invention also provide an eNB, including: a receiving module, for receiving information of a current cell available for allocation of a Un interface sent by a relay node;

an allocation module, for allocating resource of the Un interface for the relay node according to information of the current cell available for allocation of the Un interface received by the receiving module.

Compared with available art, the embodiments of the present invention have the following advantages:

Upon application of the technical solution of embodiments of the present invention, the relay node can determine information of the current cell available for allocation of the Un interface and report the information to the eNB so that the eNB can allocate corresponding Un interface resource for the relay node and further the eNB can accurately acquire resource information of the current cell available for allocation of the Un interface corresponding to the relay node, which solves the problem that the relay node cannot work normally under condition of carrier aggregation caused by mismatching between the Un interface resource directly allocated by the eNB and the relay node in prior art.

DETAILED DESCRIPTION OF PREFERRED EMBODIMENTS

As described in background, the RN is introduced into the LTE-A system to improve the throughput of the system and increase network coverage and the CA is introduced for the purpose of improving the peak rate. The embodiments of the present invention provides a method for determining carrier/cell source of the Uu interface and the Un interface in the system combing CA and RN.

Figure 1:
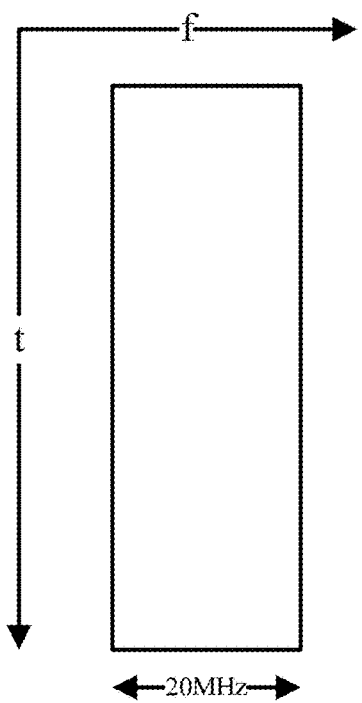
FIG. 1 is a schematic diagram showing carrier allocation of an LTE cell in prior art.
Figure 2:
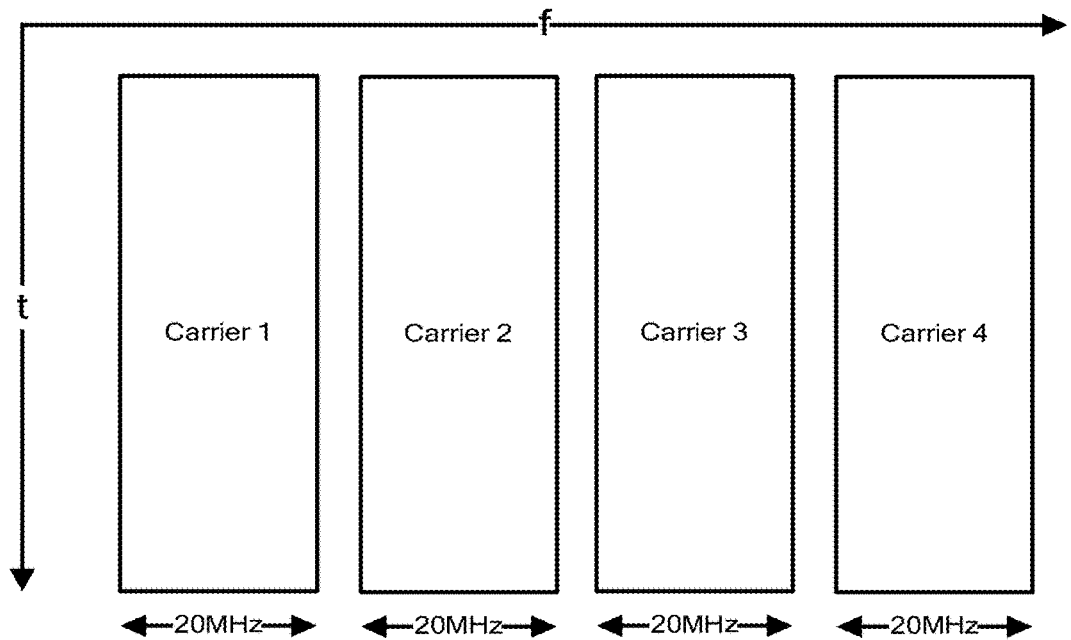
FIG. 2 is a schematic diagram showing the CA technology in prior art.
Figure 3:
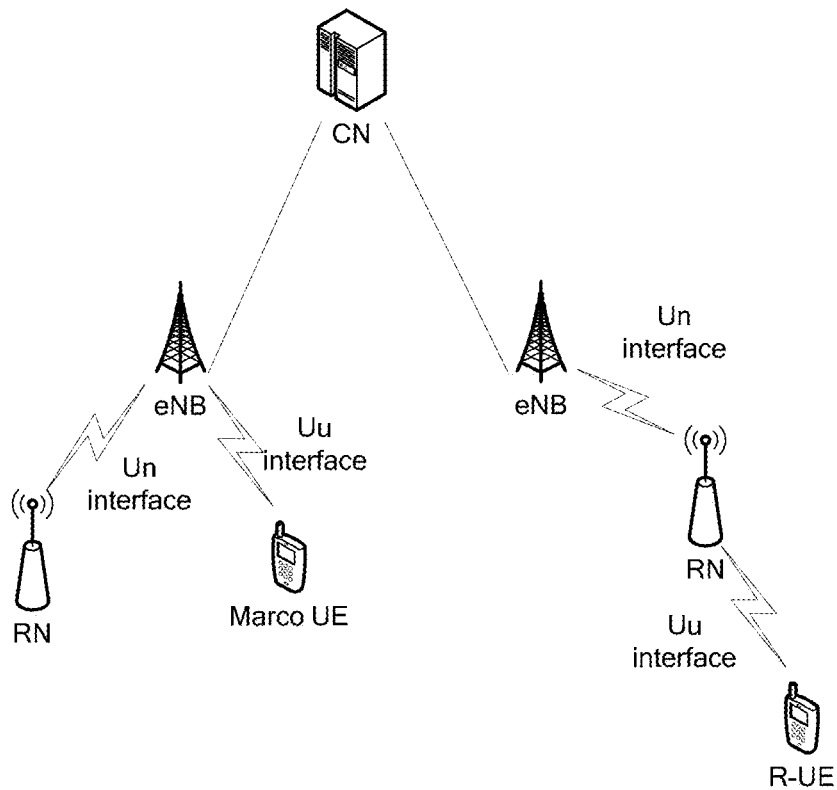
FIG. 3 is a structural diagram of an LTE-A network in prior art.
Figure 4:
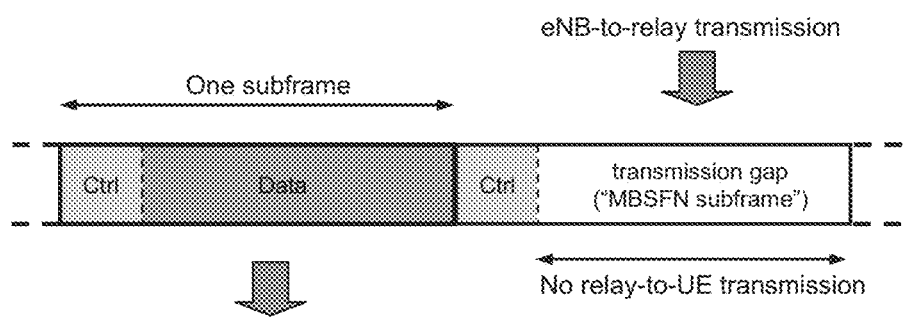
FIG. 4 is a schematic diagram showing relay link downlink transmission of a Un interface by utilizing MBSFN subframe in prior art.
Figure 5:
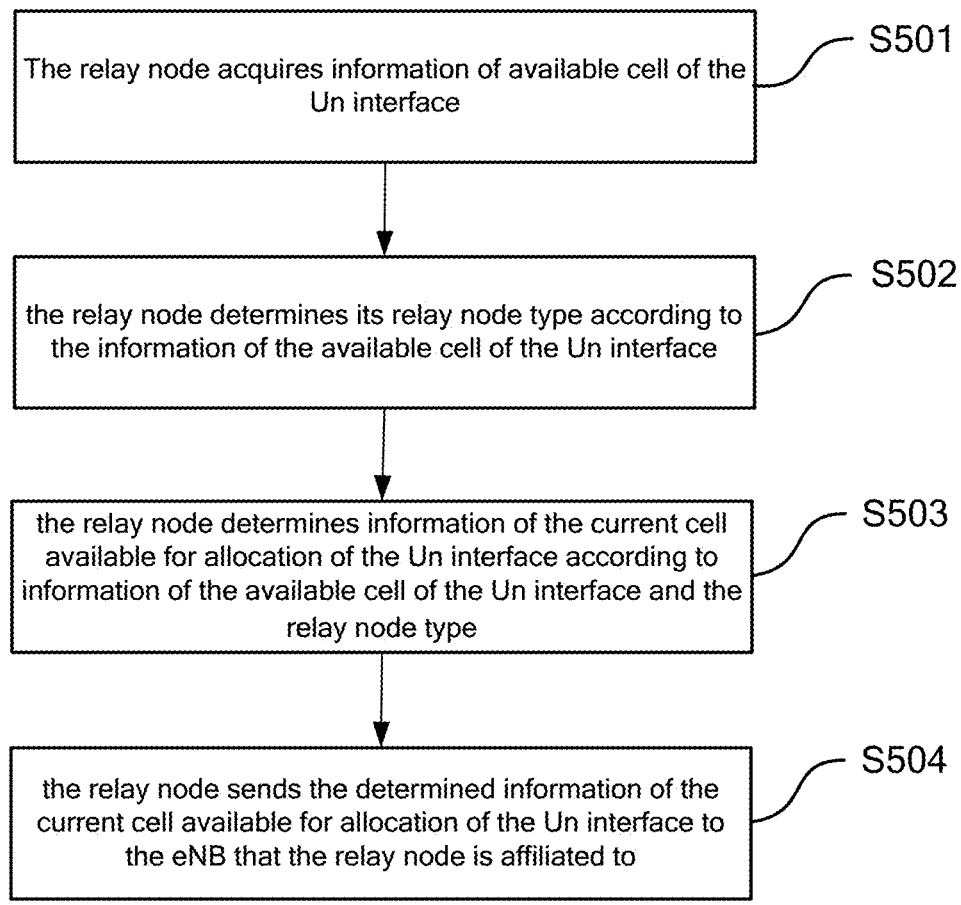
FIG. 5 is a flow diagram showing a resource allocation method of a relay node under the condition of carrier aggregation according to an embodiment of the present invention.

FIG. 5 shows a flow diagram showing a resource allocation method for a relay node under the condition of carrier aggregation according to an embodiment of the present invention, which specifically comprises the following steps:

In Step S501, the relay node acquires information of an available cell of the Un interface.

In practical application, the step is realized through the following processes:

The relay node determines affiliation relationship between each cell and the eNB to which the relay node is affiliated according to the cell list information downloaded from OAM of the relay node.

When a cell and the cell that the relay node is accessed to are affiliated to the same eNB, the relay node determines the cell as the available cell of its Un interface.

Furthermore, realization of the step further comprises acquiring information, by the relay node, the available cell of the Uu interface. The specific processing is as below. The relay node acquires information of the available cell of its Uu interface according to the cell list information of Uu interface downloaded from the OAM of the relay node. In Step S502, the relay node determines its relay node type according to information of the available cell of the Un interface.

Based on the description in step S501, when information of the available cell of the Uu interface is acquired in step S501, the specific processing in this step is as below: The relay node determines its relay node type according to the information of the available cell of the Un interface, the information of the available cell of the Uu interface and its own software/hardware capacity information.

According the above conditions, the relay node type determined in this step can be divided into the following types in specific application scenes:

Case I: when the software/hardware capacity information of the relay node only supports resource division, the relay node determines its relay node type as "Requiring resource division".

Case II: when the software/hardware capacity information of the relay node only supports not requiring resource division, the relay node determines its relay node type as "Not requiring resource division".

Case III: when the software/hardware capacity information of the relay node supports the both, the relay node type can be further divided into the following three conditions according to information of the available cell of the Un interface and information of the available cell of the Uu interface:

(1) When both the cells corresponding to information of the available cell of the Un interface and information of the available cell of the Uu interface cannot meet the requirement of not requiring resource division, the relay node determines its relay node type as "Requiring resource division".

(2) When a part of the cells corresponding to information of the available cell of the Un interface and information of the available cell of the Uu interface meet the requirement of not requiring resource division, the relay node determines its relay node type as "Requiring resource division" or "Not requiring resource division" based on its demand.

(3) When both the cells corresponding to information of the available cell of the Un interface and information of the available cell of the Uu interface meet the requirement of not requiring resource division, the relay node determines its relay node type as "Not requiring resource division".

In Step S503, the relay node determines information of a cell currently available for allocation of its Un interface according to information of the available cell of the Un interface and the relay node type.

It should be noted that after determining the relay node type in step S502, the relay node can also determine information of the current cell available for allocation of its Uu interface according to the relay node type to avoid the existence of resource that cannot be allocated in the information of the available cell of the Uu interface acquired in step S501. Information of the current cell available for allocation of the Uu interface is determined mainly based on the relay node type.

In addition, it should be noted that the sequence for determining the information of the current cell available for allocation of the Uu interface and the information of the current cell available for allocation of the Un interface can be adjusted and which information is firstly determined will not affect the protection scope of the present invention.

In step S504, the relay node sends the determined information of the current cell available for allocation of the Un interface to the eNB that the relay node is affiliated to, so that the eNB can allocate Un interface resource for the relay node according to the information of the current cell available for allocation of the Un interface.

In practical application, the specific processing in this step is as below:

The relay node reports the information of the current cell available for allocation of the Un interface to the eNB that the relay node is affiliated to through an RRC message; The eNB allocates Un interface resource for the relay node according to information of the current cell available for allocation of the Un interface and the current transmission demand.

It should be noted that in practical application, when the relay node reports the information of the current cell available for allocation of the Un interface to the eNB that the relay node is affiliated to through the RRC message, the RRC message can also carry the relay node type.

Certainly, the relay node type can be sent to the eNB through other messages.

The above description shows the realization flow of technical solution at the relay node side according to an embodiment of the present invention. Correspondingly, the eNB allocates Un interface resource directly according to information reported by the relay node at the eNB side. It will not be repeated hereby.

Compared with available technology, the embodiments of the present invention have the following advantages:

Upon application of the technical solution according to an embodiment of the present invention, the relay node can determine information of the current cell available for allocation of the Un interface and report the information to the eNB so that the eNB can allocate corresponding Un interface resource for the relay node, and the eNB can accurately acquire resource information of the current cell available for allocation of the Un interface corresponding to the relay node, which solves the problem that the relay node cannot work normally under condition of carrier aggregation caused by mismatching between the Un interface resource directly allocated by the eNB and the relay node in prior art.

The technical solution according to the embodiments of the present invention will be explained in combination with actual implementation scenes.

The embodiments of the present invention provides a method for determining resource allocation of configurable carrier/cell of the Uu interface and the Un interface by the RN in the system combining CA and RN, viz. the RN determines resource of configurable cell of RN Uu/Un interface according to RN type and then reports resource of configurable cell of the Un interface to DeNB through RRC signaling.

To facilitate the follow-up description, meanings of the terms below in follow-up embodiments of the present invention are explained hereby:

Available cell of Un interface: a cell in the cell list which is accessible by the RN and downloaded by the RN in Phase I for starting the RN, and belonging to the same DeNB with the cell to which RN chose to access in Phase II.

Configurable cell of Un interface: a cell that the RN can work at Un interface under the currently determined RN type, which may be all or a part of available cells of the Un interface.

Available cell of Uu interface: a cell downloaded by the RN from RN OAM and can be used by RN Uu interface;

Configurable cell of Uu interface: a cell that the RN can work in Uu interface under the currently determined RN type, which may be all or a part of available cells of Uu interface.

The technical solution according to the embodiments of the present invention can be specifically explained into the following aspects:

1) Determination of Available Cell of RN Un Interface

The RN can determine the affiliation relationship between a cell and a DeNB according to the former 20 bits of cell ID in the cell list information downloaded from RN OAM. If the cell is affiliated to the same DeNB with the cell that the current RN is accessed to, the cell can be determined as the available cell of RN Un interface.

In the process, the RN can also determine the available cell of RN Uu interface, viz. all cells in cell list of Uu interface configured by RN OAM.

2) Determination of RN Type. RN Type is Determined by RN Realization.

RN type is mainly determined based on: the available cell of RN Un and the available cell of RN Uu interface as well as software/hardware capacity of the RN.

RN type is determined in, but not limited to the following manners:

A. If RN software/hardware capacity only supports resource division, RN type can be determined as "Requiring resource division";

B. If RN software/hardware capacity only supports not requiring resource division, RN type can be determined as "Not requiring resource division";

C. If RN software/hardware capacity supports the both, then:

a. If the both cells supported by Uu interface and Un interface cannot meet the requirements of not requiring resource division, RN type can only be selected as "Requiring resource division";

b. If a part of cell among cells supported by Uu interface and Un interface meet the requirements of not requiring resource division, RN type can be selected as "Requiring resource division" or "Not requiring resource division". It is selected specifically depending on RN realization;

c. If the both cells supported by Uu interface and Un interface meet the requirements of not requiring resource division, the RN type can be selected as "Not requiring resource division".

3) Determination of Configurable Cell of the RN Un/Uu Interface

The determination depends on RN realization. The configurable cell of the RN Uu/Un interface is determined based on the available cell of the RN Uu/Un interface and the RN type.

For example, if the RN type is selected as "Requiring resource division", the available cell of the Uu interface whose isolation to the RN Un interface cannot meet the requirements cannot be configured as the available cell of the RN Uu interface. Wherein, the configurable cell of the Uu interface is determined mainly based on the RN type.

4) The RN Reports the Configurable Cell of the Un Interface to the DeNB

The RN reports the configurable cell of the Un interface to the RN through the RRC signaling, and the DeNB configures the cell working at the Un interface for the RN according to the cell reported by the RN and traffic transmission demand.

In addition, the RN can also carry RN type when reporting the configurable cell of the Un interface to the DeNB. RN is allowed to report the configurable cell of the Un interface and report the RN type with the same or different RRC signaling.

It should be noted that it is allowed for the RN to modify the configurable carrier resource of the Uu/Un and the RN type in follow-up process if necessary (such as UL congestion of Un interface and sufficient resource of Uu interface). The change will not affect the protection scope of the present invention.

Figure 6:
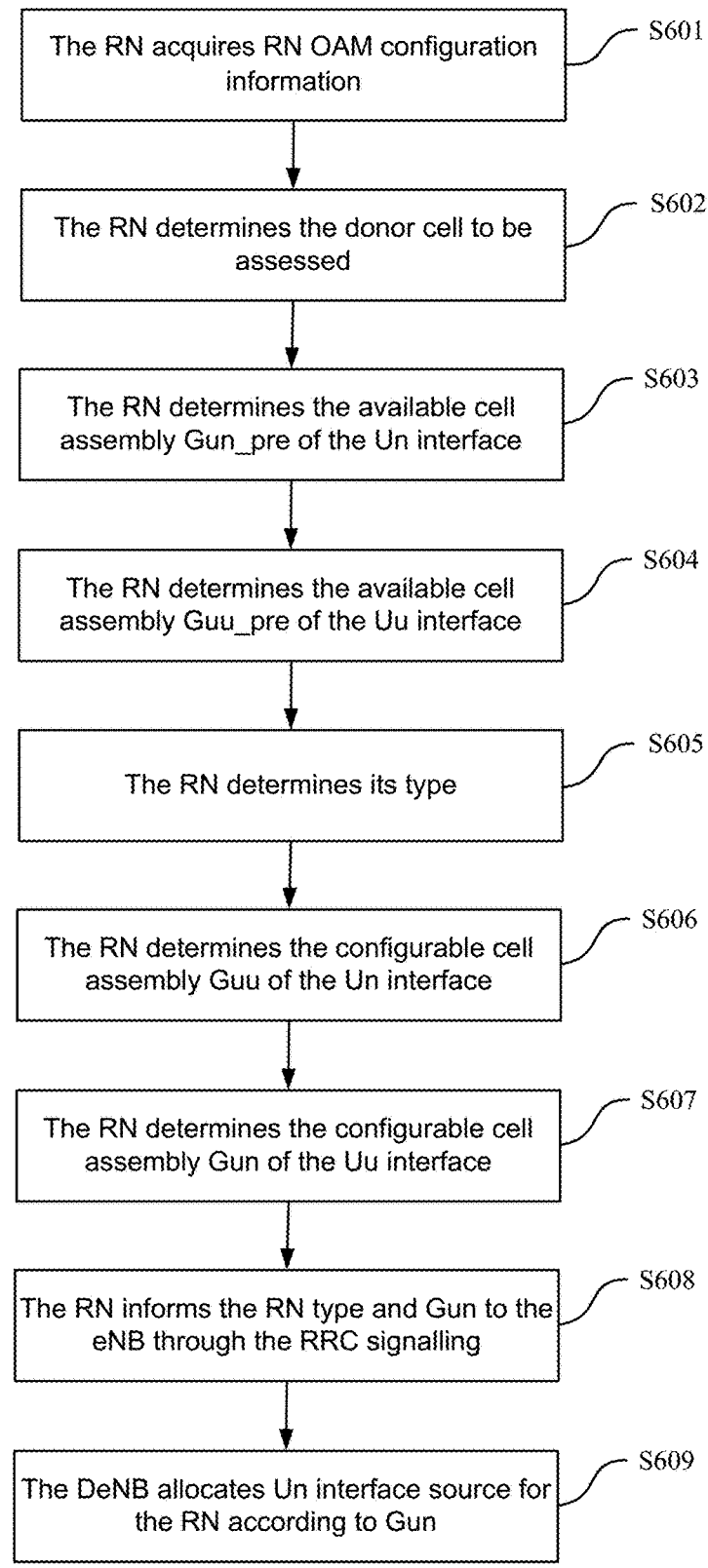
FIG. 6 is a flow diagram showing a resource allocation method of a relay node under a specific application scene at eNB side according to an embodiment of the present invention.

In a specific application scene, embodiments of the present invention further provides the following embodiment, as shown in FIG. 6, which comprises the following steps:

Step S601, the RN acquires RN OAM configuration information.

In Phase I of starting RN, the RN is attached to a network in the same manner of a UE. To be specific, the RN downloads initial configuration information from OAM of the RN and then is attached. Wherein, the RN OAM information at least comprises the cell assembly that can be aggregated at the Uu interface between the RN and R-UE, and the donor cell list allowed to be assessed by the RN;

Step S602, the RN determines the donor cell to be assessed.

The RN selects a cell from the donor cell list configured for the RN OAM at random or according to certain rules as the donor cell.

Step S603, the RN determines the available cell assembly Gun_pre of the Un interface.

The RN firstly determines which DeNB the donor cell selected in Step S602 is affiliated to and then selects all cells afflicted to the same DeNB from the donor cell list configured for RN O&M. The cells are candidate assembly Gun_pre of the available cell of the Un interface.

Step S604, the RN determines the available cell assembly Guu_pre of the Uu interface.

The cell assembly aggregated at Uu interface configured by the RN Q&M is directly used as the available cell assembly Guu_pre of the RN on the Un interface.

Step S605, the RN determines its relay node type.

The RN determines the RN type according to the available cell assembly Guu_pre of the Uu interface, the available cell candidate assembly Gun_pre of Un and the software/hardware capacity of the RN determined in the aforesaid steps in the principles as below:

(1) If RN software/hardware capacity only supports resource division, RN type can be determined as "Requiring resource division";

(2) If RN software/hardware capacity only supports not requiring resource division", the RN type can be determined as "Not requiring resource division";

(3) If RN software/hardware capacity supports the both, then:

If the both cells contained in the Guu_pre and the Gun_pre cannot meet the requirements of not requiring resource division, the RN type can only be selected as "Requiring resource division";

If partial cells contained in the Guu_pre and the Gun_pre can meet the requirements of not requiring resource division, the RN type can be selected as "Requiring resource division" or "Not requiring resource division". It is selected specifically depending on RN realization;

If the both cells contained in the Guu_pre and the Gun_pre meet the requirements of not requiring resource division, the RN type can be selected as "Not requiring resource division".

Step S606, the RN determines the configurable cell assembly Guu of the RN Uu interface.

The RN determines the configurable cell assembly Guu according to the RN type and the Guu_pre and the Gun_pre of the Uu interface. The RN will determine depending on RN realization; the RN can determine all or a part of Guu_pre as the Guu.

Step S607, the RN determines the configurable cell assembly Gun of the RN Un interface.

The RN determines the Gun through certain realization manner. For example, the RN can determine the Gun in the manners as below:

If the RN type is selected as "Not requiring resource division", the RN selects the cell meeting the requirements of not requiring resource division with all the cells in the Guu from the Gun_pre as the Gun.

If the RN type is selected as "Requiring resource division", the RN selects the cell that does not meet the requirements on isolation with any cell in the Guu from the Gun_pre as the Gun.

Step S608, the RN informs the RN type and Gun to the DeNB through the RRC signaling.

Gun is namely the configurable cell assembly between the DeNB and the RN.

Step S609, the DeNB allocates Un interface resource for the RN according to the Gun.

Compared with available technology, the embodiments of the present invention have the following advantages:

Upon application of the technical solution for embodiments of the present invention, the relay node can determine information of the current cell available for allocation of the Un interface and report the information to the eNB, so that the eNB can allocate corresponding Un interface resource for the relay node, and the eNB can accurately acquire resource information of the current cell available for allocation of the Un interface corresponding to the relay node, which solves the problem that the relay node cannot work normally under condition of carrier aggregation caused by mismatching between the Un interface resource directly allocated by the eNB and the relay node in prior art.

Figure 7:
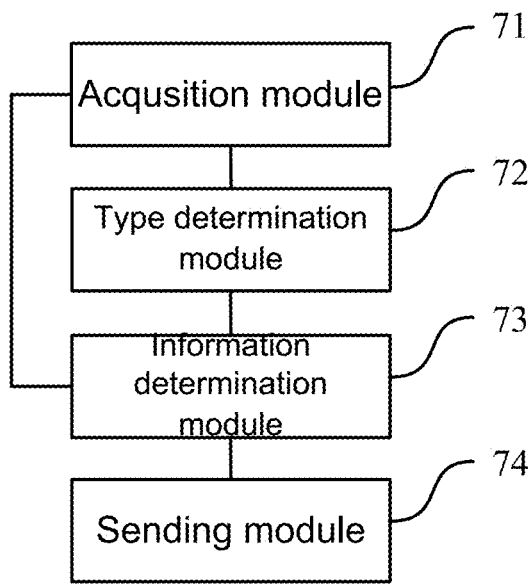
FIG. 7 is a structural diagram showing a relay node according to an embodiment of the present invention.

To realize the technical solution for embodiments of the present invention, an embodiment of the present invention also provides a relay node. The structural diagram of the relay node is shown in FIG. 7, which comprises:

an acquisition module 71, for acquiring information of an available cell of a Un interface;

a type determination module 72, for determining the relay node type according to the information of the available cell of the Un interface acquired by the acquisition module 71;

an information determination module 73, for determining information of a current cell available for allocation of the Un interface of the relay node according to the information of the available cell of the Un interface acquired by the acquisition module 71 and the relay node type determined by the type determination module 72;

a sending module 74, for sending the information of the current cell available for allocation of the Un interface determined by the information determination module 73 to the eNB that the relay node is affiliated to, in order to make the eNB allocate Un interface resource for the relay node according to information of the current cell available for allocation of the Un interface.

In a specific application scene, the acquisition module 71 is specifically used to: determine the affliction relationship between each cell and the eNB that the relay node is affiliated to, according to the cell list information downloaded from OAM of the relay node;

When a cell and the cell that the relay node is accessed to are affiliated to the same eNB, determine the cell as the available cell of Un interface of the relay node.

On the other hand, the acquisition module 71 is also used to acquire information of the available cell of the Uu interface of the relay node according to the cell list information of the Uu interface downloaded from the OAM of the relay node.

In practical application, the type determination module 72 is specifically used to determine the relay node type according to information of the available cell of the Un interface, information of the available cell of the Uu interface and the software/hardware capacity information of the relay node.

According to the practical application scenes, the type determination module 72 is specifically used to:

determine the relay node type as "Requiring resource division" when the software/hardware capacity information of the relay node only supports resource division;

determine the relay node type as "Not requiring resource division" when the software/hardware capacity information of the relay node only supports not requiring resource division;

determine the relay node type as "Requiring resource division" when the software/hardware capacity information of the relay node supports the both and both the cells corresponding to information of the available cell of the Un interface and information of the available cell of the Uu interface cannot meet the requirement of not requiring resource division;

determine the relay node type as "Requiring resource division" or "Not requiring resource division" according to the demand of relay node when the software/hardware capacity information of the relay node supports the both and a part of the cell corresponding to information of the available cell of the Un interface and information of the available cell of the Uu interface can meet the requirement of not requiring resource division;

determine the relay node type as "Not requiring resource division" when the software/hardware capacity information of the relay node supports the both and both the cells corresponding to information of the available cell of the Un interface and information of the available cell of the Uu interface meet the requirement of not requiring resource division.

In practical application, the information determination module 73 is also used to determine information of the current cell available for allocation of the Uu interface of the relay node according to the relay node type determined by the type determination module 72.

It should be further noted that the sending module 74 is specifically used to report the information of the current cell available for allocation of the Un interface to the eNB that the relay node is affiliated through the RRC message, so that the eNB can allocate Un interface resource for the relay node according to the information of the current cell available for allocation of the Un interface and the current transmission demand.

Wherein, the sending module 74 is also used to report the relay node type to the eNB that the relay node is affiliated to through the RRC message. The RRC message can be the same as or different from the RRC message for reporting information of the current cell available for allocation of the Un interface.

Figure 8:
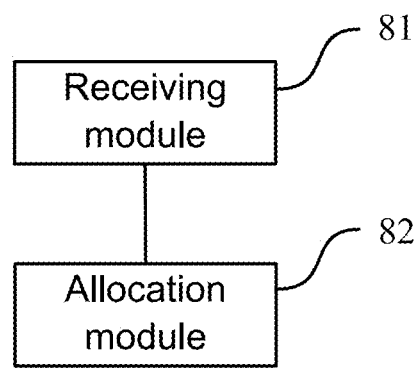
FIG. 8 is a structural diagram showing an eNB according to an embodiment of the present invention.

On the other hand, an embodiment of the present invention provides an eNB. The structural diagram of the eNB is shown in FIG. 8, which comprises:

a receiving module 81, for receiving information of the current cell available for allocation of Un interface sent by the relay node;

an allocation module 82, for allocating Un interface resource for the relay node according to information of the current cell available for allocation of the Un interface received by the receiving module 81.

In a specific application scene, the receiving module 81 is used to receive information of the current cell available for allocation of the Un interface sent by the relay node through the RRC message.

Compared with available art, the embodiments of the present invention have the following advantages:

Upon application of the technical solution for embodiments of the present invention, the relay node can determine information of the current cell available for allocation of the Un interface and report the information to the eNB, so that the eNB can allocate corresponding Un interface resource for the relay node, and the eNB can accurately acquire resource information of the current cell available for allocation of the Un interface corresponding to the relay node, which solves the problem that the relay node cannot work normally under condition of carrier aggregation caused by mismatching between the Un interface resource directly allocated by the eNB and the relay node in prior art.

With the description of the preferred embodiments hereinabove, those skilled in the art can clearly understand that the present invention can be realized with the aid of software and necessary commonly used hardware platforms, or the aid of hardware. Based on this understanding, the technical solution of the present invention or the part contributing to the current art can be reflected in the form of a software product, which is saved in a non-volatile memory medium (CD-ROM, USB, hardware disc and so on) comprising instructions to enable a terminal equipment, which could be a personal computer, a server or a network device, to carry out the methods for each embodiment of the present invention.

Those skilled in the art can understand that the drawings only refer to the diagram of a preferred embodiment, and the module or procedure is not necessary for the implementation of the embodiments of the present invention.

Those skilled in the art can understand that the module in the device of an embodiment can be allocated in such device based on embodiment description, or located in one or more devices of another embodiment through corresponding changes. Modules of the embodiments mentioned above can be merged into one module, or further divided into a plurality of submodules.

The number of the aforementioned embodiments of the present invention is only used for description rather than for representing advantages or disadvantages.

Only several specific embodiments of the present invention are released above. However, the present invention is not only comprised of those. Any change that those skilled in the art can predict shall be protected by the present invention.

The invention claimed is:

1. A resource allocation method of a relay node under a carrier aggregation scene, comprising:
   acquiring, by the relay node, information of an available cell of a Un interface;
   determining, by the relay node, its relay node type according to the information of the available cell of the Un interface;
   determining, by the relay node, information of a current cell available for allocation of the Un interface according to the information of the available cell of the Un interface and the relay node type;
   sending, by the relay node, the determined information of the current cell available for allocation of the Un interface to an eNB that the relay node is affiliated to, in order to make the eNB allocate Un interface resource for the relay node according to the information of the current cell available for allocation of the Un interface.

2. The method as claimed in claim 1, wherein the acquiring, by the relay node, information of an available cell of a Un interface comprises:
   determining, the relay node, affiliation relationship between each cell and the eNB that the relay node is affiliated to according to cell list information downloaded from OAM of the relay node; and
   determining, by the relay node, a cell as the available cell of its Un interface when the cell and the cell that the relay node is accessed to are affiliated to the same eNB.

3. The method as claimed in claim 1, wherein the acquiring, by the relay node, information of an available cell of a Un interface further comprises:
   acquiring, by the relay node, information of a available cell of a Uu interface.

4. The method as claimed in claim 3, wherein the acquiring, by the relay node, information of an available cell of a Uu interface comprises:
   acquiring, by the relay node, information of an available cell of its Uu interface according to a cell list information of the Uu interface downloaded from the OAM of the relay node.

5. The method as claimed in claim 3, wherein the determining, by the relay node, its relay node type according to the information of the available cell of the Un interface comprises:

determining, by the relay node, its relay node type according to the information of the available cell of the Un interface, the information of the available cell of the Uu interface and its own software/hardware capacity information.

6. The method as claimed in claim 5, wherein the determining, by the relay node, its relay node type according to the information of the available cell of the Un interface comprises:

When the software/hardware capacity information of the relay node only supports resource division, determining, by the relay node, the relay node type as "Requiring resource division";

When the software/hardware capacity information of the relay node only supports "Not requiring resource division", determining, by the relay node, the relay node type as "Not requiring resource division";

When the software/hardware capacity information of the relay node supports both "Not requiring resource division" and "Requiring resource division", and both the cells corresponding to information of the available cell of the Un interface and information of the available cell of the Uu interface cannot meet the requirement of not requiring resource division, determining, by the relay node, the relay node type as "Requiring resource division";

When the software/hardware capacity information of the relay node supports both "Not requiring resource division" and "Requiring resource division", and a part of the cells corresponding to information of the available cell of the Un interface and information of the available cell of the Uu interface can meet the requirement of not requiring resource division, determining, by the relay node, the relay node type as "Requiring resource division" or "Not requiring resource division" according to demand of the relay node;

When the software/hardware capacity information of the relay node supports both "Not requiring resource division" and "Requiring resource division", and both the cells corresponding to information of the available cell of the Un interface and information of the available cell of the Uu interface meet the requirement of not requiring resource division, determining, by the relay node, the relay node type as "Not requiring resource division".

7. The method as claimed in claim 1, wherein, after the relay node determines its relay node type according to information of the available cell of the Un interface, the relay node determines information of the current cell available for allocation of its Uu interface according to the relay node type.

8. The method as claimed in claim 1, wherein sending, by the relay node, the determined information of the current cell available for allocation of the Un interface to an eNB that the relay node is affiliated to, in order to make the eNB allocate Un interface resource for the relay node according to the information of the current cell available for allocation of the Un interface comprises:

reporting, by the relay node, the information of the current cell available for allocation of the Un interface to an eNB that the relay node is affiliated to through an RRC message;

allocating, by the eNB, Un interface resource for the relay node according to information of the current cell available for allocation of the Un interface and current service demand.

9. The method as claimed in claim 8, wherein, when the relay node reports the information of the current cell available for allocation of the Un interface to the eNB that the relay node is affiliated to through the RRC message, the relay node reports its relay node type to the eNB that the relay node is affiliated to through the RRC message.

10. A relay node, comprising at least one processor and a memory, wherein program instructions stored in the memory are executed by the at least one processor so that the at least one processor is to:

acquire information of an available cell of a Un interface;

determine a relay node type according to the information of the available cell of the Un interface;

determine information of a current cell available for allocation of the Un interface of the relay node according to the information of the available cell of the Un interface and the relay node type;

send the information of the current cell available for allocation of the Un interface to the eNB that the relay node is affiliated to in order to make the eNB allocate Un interface resource for the relay node according to the information of the current cell available for allocation of the Un interface.

11. The relay node as claimed in claim 10, wherein, the at least one processor is used to:

determine affiliation relationship between each cell and the eNB that the relay node is affiliated to according to cell list information downloaded from OAM of the relay node; and determine a cell as the available cell of the Un interface of the relay node when the cell and the cell that the relay node is accessed to are affiliated to the same eNB.

12. The relay node as claimed in claim 10, wherein, the at least one processor is also used to acquire information of an available cell of a Uu interface of the relay node according to cell list information of the Uu interface downloaded from the OAM of the relay node.

13. The relay node as claimed in claim 12, wherein, the at least one processor is used to determine the relay node type according to the information of the available cell of the Un interface, the information of the available cell of the Uu interface and software/hardware capacity information of the relay node.

14. The relay node as claimed in claim 13, wherein, the at least one processor is used to:

determine the relay node type as "Requiring resource division" when the software/hardware capacity information of the relay node only supports resource division;

determine the relay node type as "Not requiring resource division" when the software/hardware capacity information of the relay node only supports "Not requiring resource division";

determine the relay node type as "Requiring resource division" when the software/hardware capacity information of the relay node supports both "Requiring resource division" and "Not requiring resource division" and both the cells corresponding to information of the available cell of the Un interface and information of the available cell of the Uu interface cannot meet the requirement of not requiring resource division;

determine the relay node type as "Requiring resource division" or "Not requiring resource division" according to demand of the relay node when the software/hardware capacity information of the relay node supports both "Not requiring resource division" and "Requiring resource division" and a part of the cells corresponding to information of the available cell of the Un interface and information of the available cell of the Uu interface can meet the requirement of not requiring resource division;

determine the relay node type as "Not requiring resource division" when the software/hardware capacity information of the relay node supports both "Not requiring resource division" and "Requiring resource division" and both the cells corresponding to information of the available cell of the Un interface and information of the available cell of the Uu interface meet the requirement of not requiring resource division.

15. The relay node as claimed in claim 10, wherein, the at least one processor is also used to determine information of the current cell available for allocation of the Uu interface of the relay node according to the relay node type determined by the type determination module.

16. The relay node as claimed in claim 10, wherein, the at least one processor is used to:
report the information of the current cell available for allocation of the Un interface to the eNB that the relay node is affiliated to through an RRC message, so that the eNB allocates Un interface resource for the relay node according to the information of the current cell available for allocation of the Un interface and current service demand.

17. The relay node as claimed in claim 16, wherein, the at least one processor is also used to:
report the relay node type to the eNB that the relay node is affiliated to through the RRC message.

\* \* \* \* \*